United States Patent [19]

Cooley et al.

[11] Patent Number: 4,488,001

[45] Date of Patent: Dec. 11, 1984

[54] INTELLECTUAL PROPERTIES PROTECTION DEVICE

[75] Inventors: John J. Cooley, Escondido, Calif.; DuWayne D. Oosterbaan, Winter Springs, Fla.

[73] Assignee: NCR Corporation, Dayton, Ohio

[21] Appl. No.: 331,710

[22] Filed: Dec. 17, 1981

[51] Int. Cl.³ .......................... H04L 9/02; H04K 1/02
[52] U.S. Cl. ................................. 178/22.09; 178/22.14
[58] Field of Search ............... 178/22.13, 22.14, 22.15, 178/22.06, 22.09, 22.19; 364/200, 900

[56] References Cited

U.S. PATENT DOCUMENTS

| 4,168,396 | 9/1979 | Best | 364/200 X |
|---|---|---|---|
| 4,246,638 | 1/1981 | Thomas | 364/200 |
| 4,434,322 | 2/1984 | Ferrell | 178/22.14 |

Primary Examiner—Sal Cangialosi
Assistant Examiner—K. R. Kaiser
Attorney, Agent, or Firm—J. T. Cavender; Edward Dugas; Arthur A. Sapelli

[57] ABSTRACT

A device for deciphering encoded information is disclosed which comprises logic elements which combine a key input to implement a predetermined set of boolean transformations thereby yielding a corresponding set of translation terms. The translation terms are subsequently combined with corresponding encoded information to yield deciphered information.

9 Claims, 6 Drawing Figures

INTELLECTUAL PROPERTIES PROTECTION DEVICE

BACKGROUND OF THE INVENTION

This invention relates to a deciphering device for utilization within a data processing environment and, more particularly, to a deciphering device for decoding ciphered information stored in a memory system, insuring complete security and privacy of the information stored within the memory system of the data processing environment.

Intellectual properties such as software, firmware, data bases or any other form of collected information may be recorded using a wide variety of memory technologies. Certain of these memory technologies are intended for direct access by a computer system or processing element. Such memory technologies include ROM, RAM, CAM, writeable control store, etc. When information is stored in a memory system of a data processing environment using these technologies, it may be directly available to unauthorized access. ROM devices are particularly vulnerable due to their easy removability. With the increasing use of telecommunications in computer system networks, the very long cable connection between terminals or I/O devices and control units and the easy removability of storage medium of the memory system, there is an increasing concern over the interception or alteration of information because physical protection cannot always be guaranteed. Cryptography has been recognized as one type of mechanism for achieving data security and privacy in that it protects the data itself rather than the medium of storing or transmitting the information.

Various systems have been developed for enciphering/deciphering messages to maintain the security and privacy of information stored in the memory elements or storage medium within the data processing environment and for the communication of the information between data processing systems. One such enciphering system is a block cipher system, which is a substitution technique in which an entire block of information is enciphered in accordance with a predetermined cipher key. The resulting substituted information is unintelligible cipher text which cannot be understood without knowledge of the cipher key. Another cipher system relates to a product cipher which combines linear and nonlinear transformations of a clear text message with the transformations being a function of a cipher key. Still another cipher system is directed to a product cipher system in which the block of clear text is processed on a segment basis in which each segment is serially transformed in accordance with a portion of the cipher key.

In many of the prior art systems knowledge of the cipher key enables the data to be deciphered relatively easily. Therefore, there exists a need for an improved cipher/decipher system in which knowledge of the cipher key and/or knowledge of the combining function of the key with the ciphered text is insufficient to decipher the stored information, hence, providing additional security for the information stored in the memory element or storage medium.

SUMMARY OF THE INVENTION

In the present invention, a deciphering device is provided for deciphering encoded information which comprises a plurality of driver circuit elements, having a plurality of key input terminals adapted to receive a key signal, which generate a plurality of translation terms. Logic elements, operatively connected to the plurality of driver circuit elements and which include a plurality of data input terminals adapted to receive encoded information, combine the encoded information with a corresponding translation term to yield deciphered information.

The logic elements, which combine the key signals, implement a predetermined set of Boolean transformations to yield the translation terms. The deciphering device of the present invention provides the additional security of the stored information by the particular Boolean transformation implemented, any such transformation being possible. Hence, in order to decipher the encoded information, it is insufficient to know the key, the translation element, and the corresponding combining function of the translation element. The deciphering device of the present invention requires the additional knowledge of the Boolean transformation implemented, which can be integrated directly with the processing element via custom LSI, thereby yielding maximum protection since the implemented Boolean transformation would not be available or known anywhere outside the integrated circuit chip.

Accordingly, it is an object of the present invention to provide a device for securing privacy of the information.

This and other objects of the present invention will become more apparent when taken in conjunction with the following description and attached drawings, wherein like characters indicate like parts, and which drawings form a part of the present invention.

DETAILED DESCRIPTION

Figure 1:
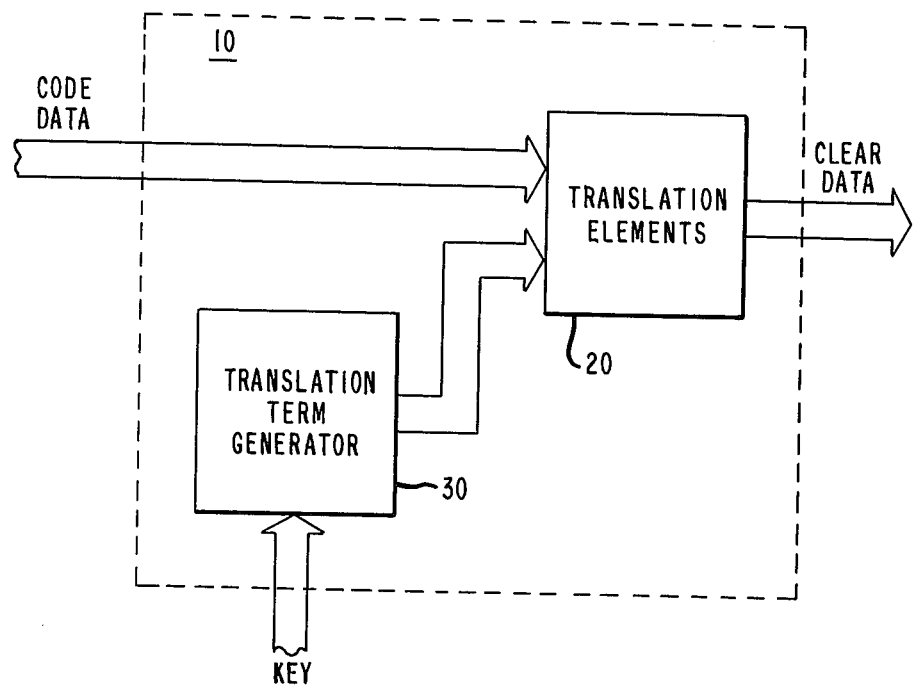
FIG. 1 shows a block diagram of the preferred embodiment of the deciphering device of the present invention.

The invention set forth and claimed herein is a deciphering device or sometimes referred to as the intellectual properties protection device (IPPD). Referring to FIG. 1, there is shown the deciphering device 10 which comprises the translation elements 20 operatively coupled to the translation term generator 30. CODED DATA (which is encoded or ciphered information) is input to the deciphering device 10. A KEY or KEY signal is input to the translation term generator 30 of the deciphering device 10. The KEY signal is utilized to generate a plurality of translation terms which is then coupled to the translation elements 20. The translation elements 20 combine the encoded information with corresponding translation terms, thereby yielding decoded or deciphered information (CLEAR DATA).

Figure 2A:
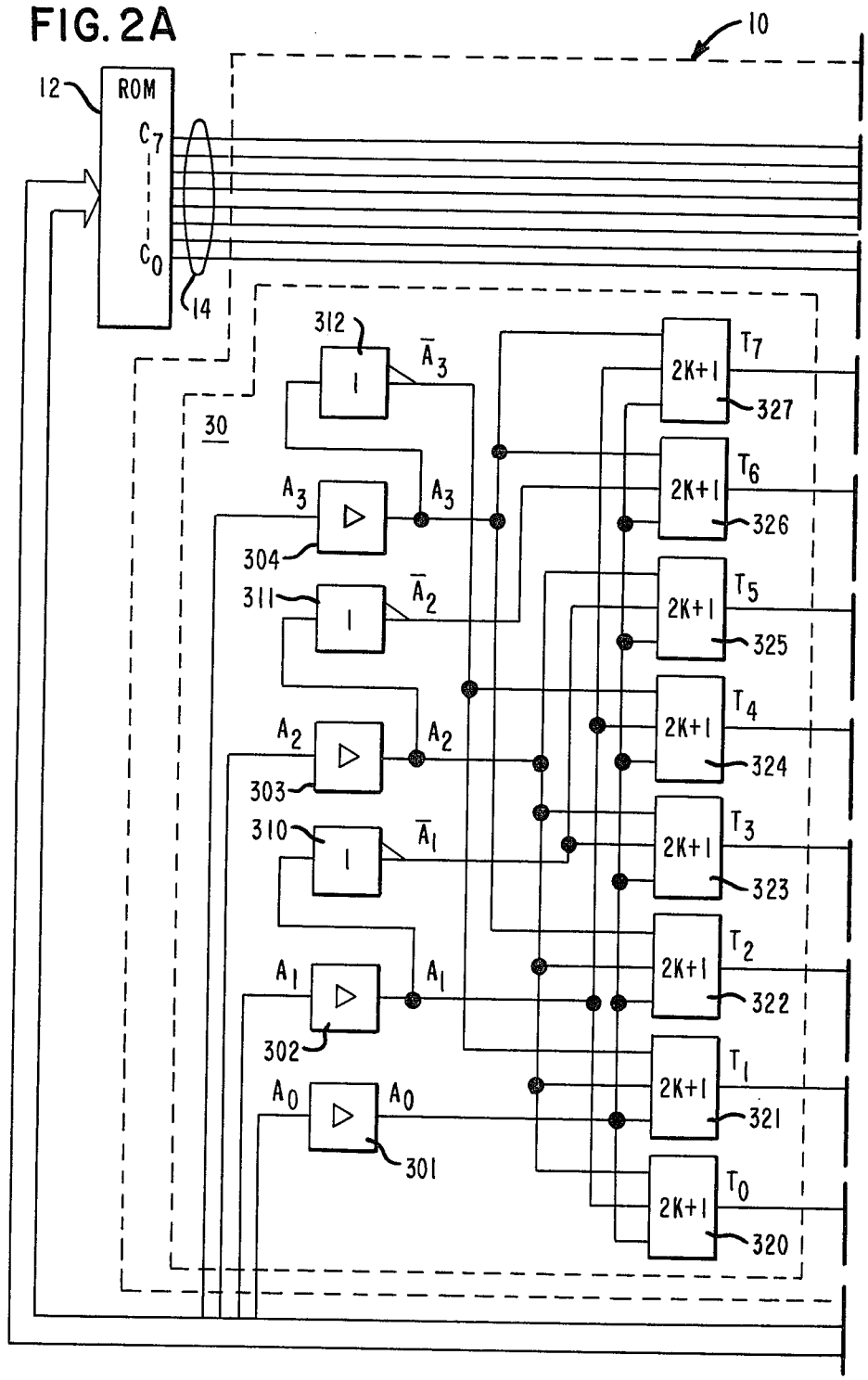
FIGS. 2A and 2B, taken together, show a logic diagram of the preferred embodiment of the present invention having a dynamic key within a typical data processing environment.
Figure 2B:
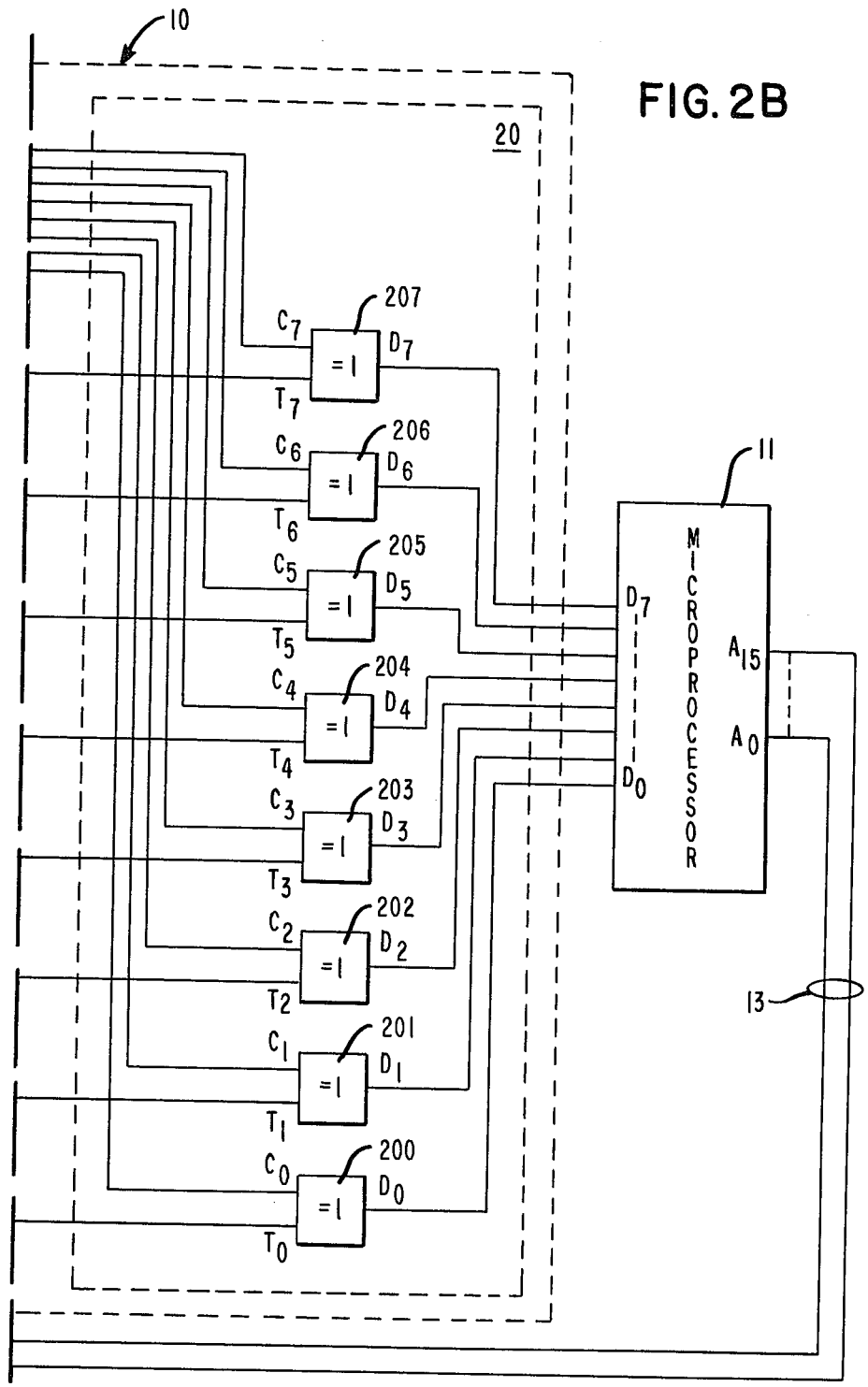

Referring to FIGS. 2A and 2B, which taken together are referred to hereinunder as FIG. 2, there is shown a logic diagram of the preferred embodiment of the present invention within a typical data processing environment. The translation elements 20 of the deciphering device 10 comprise a plurality of EXCLUSIVE-OR gates (X-OR gates) 200 thru 207. The output $D_0$-$D_7$ of the X-OR gates 200–207 is CLEAR DATA. The CLEAR DATA is input to and usable by a microprocessor 11. The deciphered information can be instruction words or bytes, data, etc.

When the microprocessor 11 desires to fetch information from ROM 12, a ROM address is sent to ROM 12 via address lines 13. The address lines 13 comprise a 16-bit address $A_0$ thru $A_{15}$. The read cycle from ROM 12 then causes the enciphered information stored in ROM 12 to be placed on the coded data lines 14, the enciphered information being an 8-bit byte $C_0$ thru $C_7$. The enciphered information is then directed to deciphering device 10, and more specifically is inputted to a corresponding input of EXCLUSIVE-OR gates 200–207. The second input of X-OR gates 200–207 is a corresponding translation term $T_0$ thru $T_7$. Translation terms are generated by the translation term generator 30.

In the preferred embodiment of the present invention, translation terms are generated from the KEY signal. The KEY signal of the preferred embodiment comprises address bits $A_0$ thru $A_3$. Address bits $A_0$ thru $A_3$ are coupled to respective driver circuits 301 thru 304 to generate respective KEY terms $A_0$ thru $A_3$. Address bits $A_1$ thru $A_3$ are coupled to inverters 310 thru 312 to generate respective KEY term complement signals $\overline{A1}$ thru $\overline{A3}$. The "2K+1" logic elements 320 thru 327 combine various KEY term and KEY term complement signals to generate respective translation terms $T_0$ thru $T_7$. (A "2K+1" logic element is one whose output is active if, and only if, an odd number of inputs are active.) The KEY term signals and KEY term complement signals are coupled to the "2K+1" logic elements 320–327 such that they are combined by the "2K+1" logic elements 320–327 in accordance with the logic equations of TABLE I (the "$\oplus$" symbol denotes an exclusive-OR function.)

Figure 3:
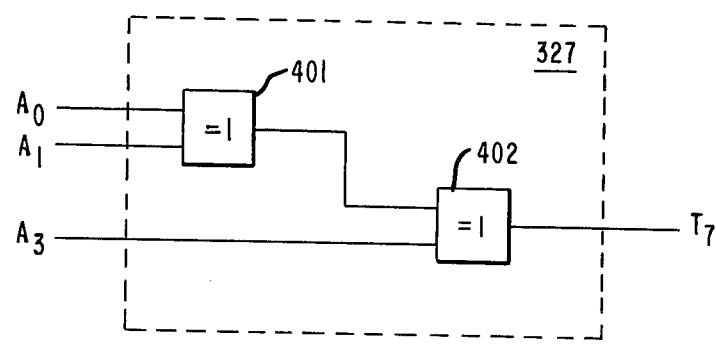
FIG. 3 shows a logic diagram of a "2K+1" logic element.

TABLE I $T_7 = A_1 \oplus \overline{A_3} \oplus A_0$
$T_6 = A_3 \oplus \overline{A_2} \oplus A_0$
$T_5 = A_2 \oplus \overline{A_1} \oplus A_0$
$T_4 = \overline{A_1} \oplus A_3 \oplus A_0$
$T_3 = \overline{A_1} \oplus A_2 \oplus A_0$
$T_2 = A_2 \oplus \overline{A_3} \oplus A_0$
$T_1 = A_2 \oplus A_3 \oplus A_0$
$T_0 = A_1 \oplus A_2 \oplus A_0$ The outputs of the "2K+1" logic elements 320–327 are translation terms $T_0$ thru $T_7$ respectively, which are then coupled to the respective X-OR circuits 200 thru 207. Although the translation elements 200 thru 207 of the preferred embodiment are X-OR circuits, it will be appreciated by those skilled in the art that other logic gates or elements may be used as well. FIG. 3 shows the "2K+1" logic element 327 which comprises two X-OR gates 401, 402.

The operation of the deciphering device 10 will now be described with the aid of Tables II and III. By way of example, let the coded data stored in ROM address 0000 thru 000F (HEX) be 6A (HEX), . . . 9A (HEX), respectively as shown in Table II. The corresponding CLEAR DATA is also shown in Table II. Assume that ROM address 0006 is to be accessed. The coded data read from ROM 12 will be BA (HEX). The KEY as shown in Table III will be that portion of the address A3 thru A0, i.e., 0110 binary. Applying the Boolean transformation of Table I to the KEY, the translation terms T7 thru T0 will be 10101100 binary, respectively. Applying the coded data (BA (HEX) of ROM 12) of C7 thru C0, i.e. 10111010 binary, and the respective translation terms T7 thru T0, to the exclusive-OR function of the translation elements 327 thru 320 respectively, the output result will be the CLEAR DATA 00010110 binary or 16 (HEX) as shown in Table II. It is understood that the encoded information stored in ROM 12 is arrived at by applying the inverse of the deciphering function to the unciphered information.

TABLE II

| Address (HEX) | Coded Data (HEX) | Clear Data (HEX) |
|---|---|---|
| 0000 | 6A | 10 |
| 0001 | 94 | 11 |
| 0002 | D1 | 12 |
| 0003 | 2F | 13 |
| 0004 | 01 | 14 |
| 0005 | FF | 15 |
| 0006 | BA | 16 |
| 0007 | 44 | 17 |
| 0008 | B4 | 18 |
| 0009 | 4A | 19 |
| 000A | 0F | 1A |
| 000B | F1 | 1B |
| 000C | DF | 1C |
| 000D | 21 | 1D |
| 000E | 64 | 1E |
| 000F | 9A | 1F |

TABLE III

| Address (hex) | Key (binary) | | | | Translation Terms (binary) | | | | | | | |
|---|---|---|---|---|---|---|---|---|---|---|---|---|
|  | $A_3$ | $A_2$ | $A_1$ | $A_0$ | $T_7$ | $T_6$ | $T_5$ | $T_4$ | $T_3$ | $T_2$ | $T_1$ | $T_0$ |
| 0000 | 0 | 0 | 0 | 0 | 0 | 1 | 1 | 1 | 1 | 0 | 1 | 0 |
| 0001 | 0 | 0 | 0 | 1 | 1 | 0 | 0 | 0 | 0 | 1 | 0 | 1 |
| 0002 | 0 | 0 | 1 | 0 | 1 | 1 | 0 | 0 | 0 | 0 | 1 | 1 |
| 0003 | 0 | 0 | 1 | 1 | 0 | 0 | 1 | 1 | 1 | 1 | 0 | 0 |
| 0004 | 0 | 1 | 0 | 0 | 0 | 0 | 0 | 1 | 0 | 1 | 0 | 1 |
| 0005 | 0 | 1 | 0 | 1 | 1 | 1 | 1 | 0 | 1 | 0 | 1 | 0 |
| 0006 | 0 | 1 | 1 | 0 | 1 | 0 | 1 | 0 | 1 | 1 | 0 | 0 |
| 0007 | 0 | 1 | 1 | 1 | 0 | 1 | 0 | 1 | 0 | 0 | 1 | 1 |
| 0008 | 1 | 0 | 0 | 0 | 1 | 0 | 1 | 0 | 1 | 1 | 0 | 0 |
| 0009 | 1 | 0 | 0 | 1 | 0 | 1 | 0 | 1 | 0 | 0 | 1 | 1 |
| 000A | 1 | 0 | 1 | 0 | 0 | 0 | 0 | 1 | 0 | 1 | 0 | 1 |
| 000B | 1 | 0 | 1 | 1 | 1 | 1 | 1 | 0 | 1 | 0 | 1 | 0 |
| 000C | 1 | 1 | 0 | 0 | 1 | 1 | 0 | 0 | 0 | 0 | 1 | 1 |
| 000D | 1 | 1 | 0 | 1 | 0 | 0 | 1 | 1 | 1 | 1 | 0 | 0 |
| 000E | 1 | 1 | 1 | 0 | 0 | 1 | 1 | 1 | 1 | 0 | 1 | 0 |
| 000F | 1 | 1 | 1 | 1 | 1 | 0 | 0 | 0 | 0 | 1 | 0 | 1 |

Figure 4:
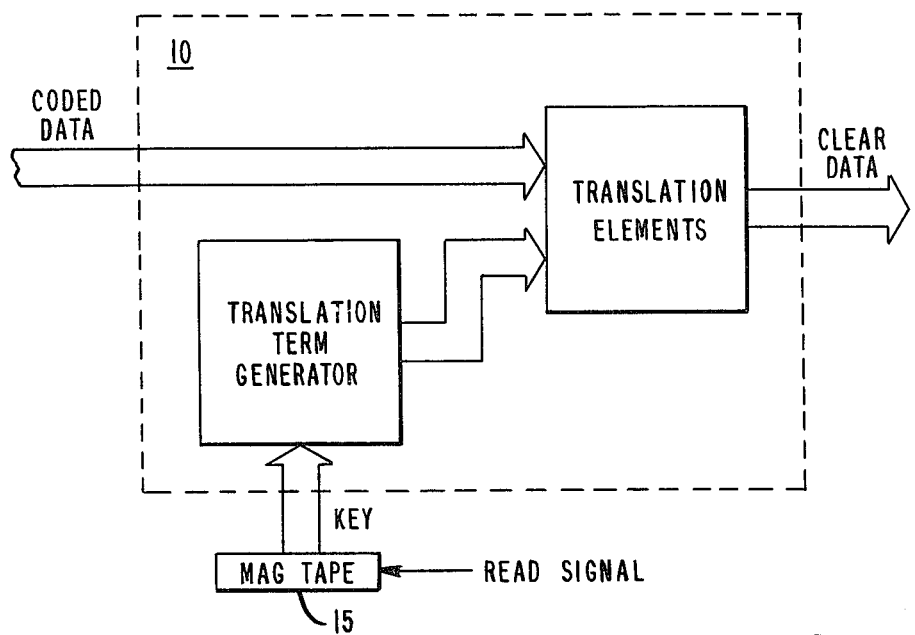
FIG. 4 shows a block diagram of the deciphering device of the present invention utilizing a programmable key.

The KEY utilized in the preferred embodiment varies with the ROM address access, and as such is classified as a dynamic KEY. It will be recognized by those skilled in the art that the KEY may also be static or programmable, i.e., fixed or be completely independent of the operation of the data processing environment. Referring to FIG. 4, there is shown a type of programmable key. The deciphering device 10 is the same as that described above. The KEY signal is read from a magnetic tape 15, or other input device. The READ SIGNAL provides the control signal to the mag tape 15 for reading the next key word or KEY signal stored on the tape.

Figure 5:
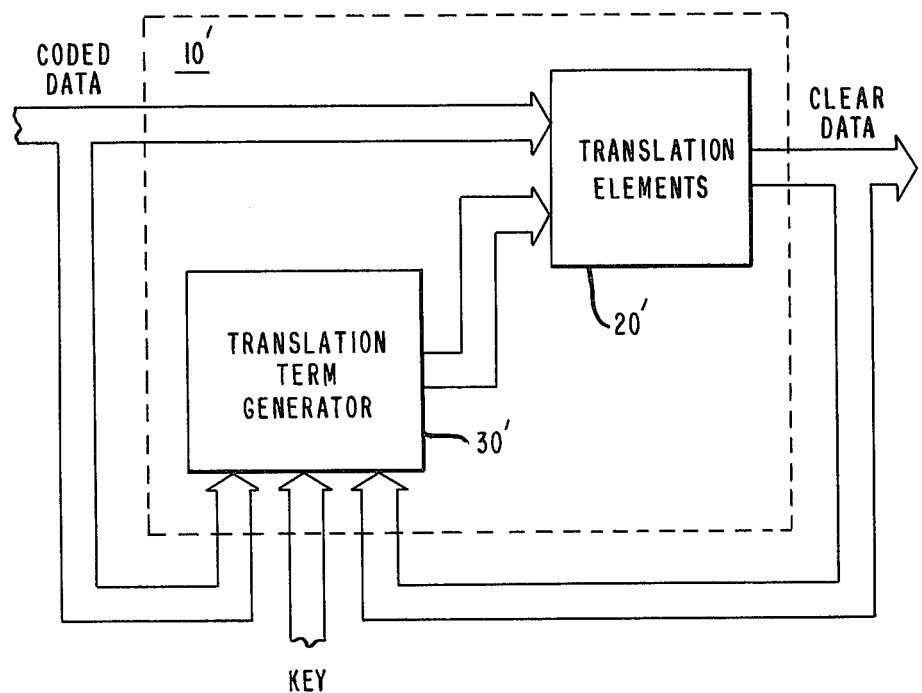
FIG. 5 shows an alternative embodiment of the present invention utilizing a plurality of inputs to the translation term generator of the deciphering device.

An alternative embodiment is shown in FIG. 5. Translation elements 20' are operatively coupled to a translation term generator 30'. CODED DATA is input to the deciphering device 10'. A KEY (key signal) is input to the translation term generator 30' of the deciphering device 10'. In addition, the CODED DATA and CLEAR DATA signals are also fed into translation term generator 30'. All three signals inputted to translation term generator 30' are utilized to generate a plurality of translation terms which are then coupled to the translation elements 20'. It will be recognized by those skilled in the art that the generation of the translation terms may include combining a variety of the input signals to the translation term generator 30' utilizing a variety of boolean transformations similar to that described above. It will also be recognized that many Boolean transformations are possible within the translation term generator 30'. Although the preferred embodiment and the alternative embodiment show coded data bits being equal in number to the decoded data bits, it will be appreciated by those skilled in the art that this is not necessary within the true scope of the invention.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a data processing system having a processor, an addressable data storage means, and a multiconductor address bus between the processor and the data storage means for transmitting addresses of data storage locations in the addressable data storage means, a device for deciphering encoded data stored in the data storage means comprising:
   term generating means connected to selected address bus conductors whose number is less than the total number of conductors in said address bus, said term generating means operable for generating translation terms responsive to the states of address bits on the address conductors; and
   translation means connected to the data storage means and to said term generating means, said translation means including input means for receiving addressed encoded data from the data storage means, and further being operable for performing boolean operations between the bits of said encoded data paired with the bits of translation terms generated by said term generating means thereby generating deciphered data for use by the processor;
   wherein said term generating means further comprises a plurality of inverters connected to selected ones of the conductors in the address bus, said term generating means being operable such that the generated translation terms are additionally generated responsive to the states of said inverters.

2. The data processing system of claim 1 wherein said translation means comprises exclusive OR gates for performing exclusive OR operations between the bits of said encoded data paired with the bits of translation terms generated by said term generating means.

3. The data processing system of claim 1 wherein said term generating means comprises a plurality of circuits, each of said circuits being connected to at least two conductors selected from the address bus conductors and to not more than one of said inverters, each of said circuits further being operable for generating one bit of a translation term.

4. The data processing system of claim 3 wherein each of said circuits is a 2K+1 logic element whose output is active only when an odd number of its inputs are active.

5. The data processing system of claim 1 wherein said term generating means is connected to the address bus conductors for the lowest four bits of an address transmitted to the data storage device.

6. A device for deciphering encoded data comprising:
   data storage means for storing encoded data in addressable storage locations;
   an address bus for transmitting to said data storage means, addresses of encoded data stored therein to be deciphered;
   key supplying means for supplying key signals responsive to an address being transmitted over said address bus wherein the number of bits of each supplied key are less than the number of bits of the addresses transmitted over said address bus;
   term generating means connected to said key supplying means, said term generating means operable for generating translation terms responsive to the states of bits of said key signals; and
   translation means connected to said data storage means and said term generating means, said translation means including input means for receiving addressed encoded data from said data storage means, and further being operable for performing boolean operations between the bits of said encoded data paired with the bits of translation terms generated by said term generating means thereby generating deciphered data.

7. The device of claim 6 wherein said key supplying means comprises conductor means connected to said address bus for supplying selected bits of an address transmitted over said address bus as key signals to said term generating means.

8. The device of claim 6 wherein said key supplying means comprises key storage means operable for supplying stored key signals to said term generating means responsive to the occurrence of an address being transmitted over said address bus.

9. The device of claim 8 wherein said key storage means is a tape drive.

* * * * *